Figure 1:
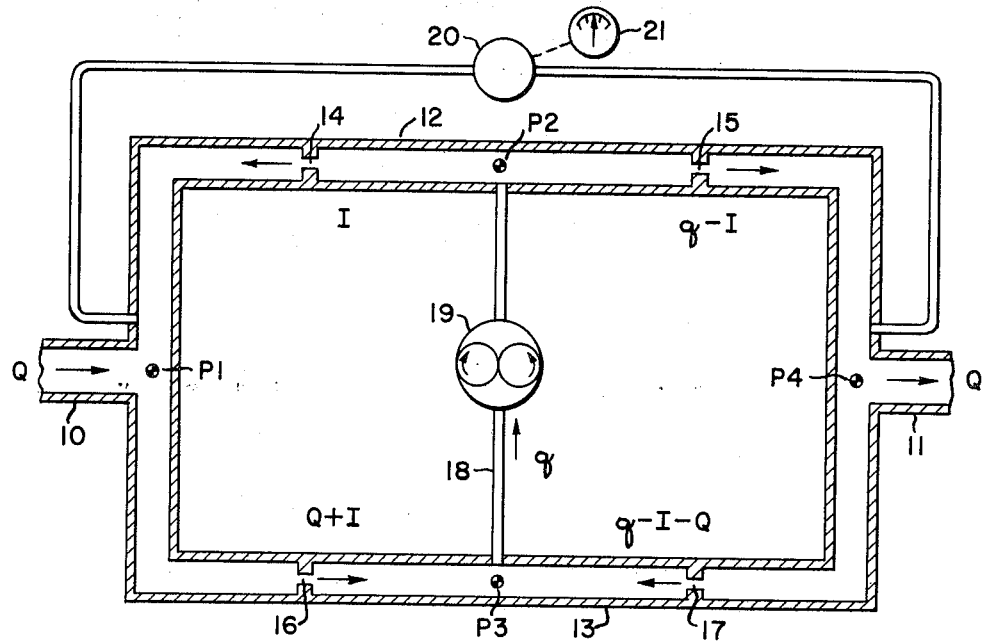

Feb. 1, 1966  B. FISHMAN ET AL  3,232,105

MASS FLOWMETER

Filed July 22, 1963

INVENTOR.
BY BERNARD FISHMAN
GERALD BLOOM

United States Patent Office 3,232,105
Patented Feb. 1, 1966

3,232,105
MASS FLOWMETER
Bernard Fishman, New York, and Gerald Bloom, Spring Valley, N.Y., assignors, by mesne assignments, to Flotron Inc., a corporation of New Jersey
Filed July 22, 1963, Ser. No. 296,698
6 Claims. (Cl. 73—205)

This invention relates to apparatus adapted to measure rate of flow of fluids and more particularly relates to flowmeters adapted to measure mass flow rate in a linear manner.

Flowmeters adapted to measure the rate of flow through a conduit can usually be classified into one of three types, namely, volumetric, differential pressure, and mass-rate.

In the volumetric flowmeter the flow of liquid causes a propeller or turbine to revolve with an angular velocity proportional to the volume of fluid passing through it. In other embodiments the flow causes rotation of a nutating disc, rotation of an oscillating piston, or reciprocation of plungers. Such volumetric flowmeters require a converter to give actual flow rate. In order to read out mass flow rate, it is necessary that a signal proportional to the density of the fluid be combined with the flowmeter readings.

Differential pressure flowmeters measure flow rate by sensing the differential pressure across a flow restrictor such as an orifice or in a venturi, flow nozzle, pitot tube, or other such device. The velocity head or kinetic energy due to the fluid velocity is measured in this type of meter. Since there is a known relationship between velocity head and fluid velocity for each specific meter, the fluid velocity can be determined by the following formula:

$$V = C\sqrt{2g\frac{\Delta P}{S}} = C\sqrt{\frac{2}{\rho}}$$

where:

$V$ = velocity of fluid
$C$ = metering element coefficient
$g$ = gravity constant
$\Delta P$ = differential pressure
$S$ = weight density of fluid
$\rho$ = mass density of fluid Mass flow rate is equal to $$M = \rho A V = CA\sqrt{2\rho\Delta P}$$

where:

$M$ = mass flow rate
$A$ = area of the metering element cross section.

Therefore, using known differential pressure flowmeters to obtain mass flow rate measurements also requires measurement of density and extraction of the square root of the readout. Further, the differential pressure output signal by itself has a non-linear relationship to the flow rate and cannot be related to either the mass or volumetric flow rate except by including a fluid density factor.

Both volumetric and differential pressure flowmeters have the additional fault that they will not accurately measure flow rate when the flow is pulsating or during transients. In the measurement of pulsating or transient flows, the accuracy of the volumetric type flowmeter is limited by the poor response characteristics of the known sensing elements. The differential pressure type flowmeter will introduce errors in measuring transient or pulsating flows due to the non-linear flow to readout relationship.

There are two basic types of mass rate flowmeters, namely, angular momentum and recirculating type meters. In the former, angular momentum is imparted to the flowing fluid by means of a constant speed driving motor and the readout signal is obtained as a torque. This type of mass rate flowmeter is expensive and tends to require a great deal of maintenance.

In the recirculation type of mass rate flowmeter, recirculation pumps or other such devices are used to obtain a recirculation of a constant volumetric flow in the meter. The meter is essentially a differential pressure type meter in which a constant volumetric flow is added or subtracted from the fluid flow being measured. The subject invention is an improved flowmeter of this type.

It is an object of this invention to provide a flowmeter which uses a single differential pressure indicator or transducer to obtain a linear indication of mass flow rate of fluids having different densities.

It is another object of this invention to provide such a flowmeter which uses a single differential pressure indicator transducer for sensing differential pressure across two orifices.

It is another object of this invention to provide such a flowmeter which accurately measures transient or pulsating flow as well as steady flow.

It is another object of this invention to provide such a flowmeter which is inexpensive, simply constructed and requires a minimum of maintenance.

A further object of this invention is to provide a mass flowmeter of the type comprising a constant volume recirculating pump and a pair of conduits bypassing said pump wherein each of said conduits contains a pair of orifices of predetermined flow characteristics.

In prior co-pending application Serial No. 289,970, filed June 24, 1963, there is described a mass flowmeter comprising a pair of branch conduits connecting inlet and outlet conduits in which the flow is to be measured, said branch conduits each having a pair of orifices, and a constant volume recirculating pump connecting said two branch conduits at points intermediate the orifices therein. According to an embodiment in said prior application, all four orifices had the same flow characteristics, i.e., the product of discharge coefficient and cross sectional area of each orifice was the same. By proper placement of a measuring device the mass flow rate through the inlet conduit could be read as a linear function of the pressure differential as measured by said device.

The device of this co-pending application is superior to conventional flow measuring devices in that flow rate is a linear function of pressure and not a square root function. This device has the further advantage that pulsating and irregular flows can be measured much more accurately than in the conventional differential pressure flowmeter. However, said device does require four orifices of identical flow characteristics.

According to the present invention we have found that flow can be measured accurately in flowmeters of the type described in this prior co-pending application by providing two matched pairs of flow restrictors in which each of the flow restrictors in a pair has the same flow characteristics as the other restrictor in that pair, but the restrictors in one pair do not have identical flow characteristics to the restrictors in the other pair. It is much simpler to obtain two matched pairs of flow restrictors than to obtain four orifices having the same flow characteristics.

Further, by choosing two matched pairs of flow restrictors or orifices with each of one pair having larger openings than each of the other pair there are certain advantages over the flowmeter utilizing four matched orifices. For instance, with a change in viscosity of the measured fluid the flow coefficients of the orifices will change and effect the accuracy of the flowmeter. However, by preselecting the sizes, shapes and relationships of these matched pairs of orifices it is possible to obtain a mean flowmeter reading over a range of viscosities by so choosing the pairs so that the flow coefficients of one pair, comprising, for example, rounded edge orifices, will increase with a specified change in viscosity of the measured fluid at the same time that the flow coefficients of the other pair, comprising, for example, sharp edged orifices, will decrease.

Still further, it is possible to size the matched pairs in such a manner that a larger orifice is on the input side of the recirculating pump and a smaller orifice on the output side which is very desirable from the standpoint of maintaining pressure without the system and thus diminishing or preventing cavitation within the system which effects the accuracy thereof.

Figure 2:
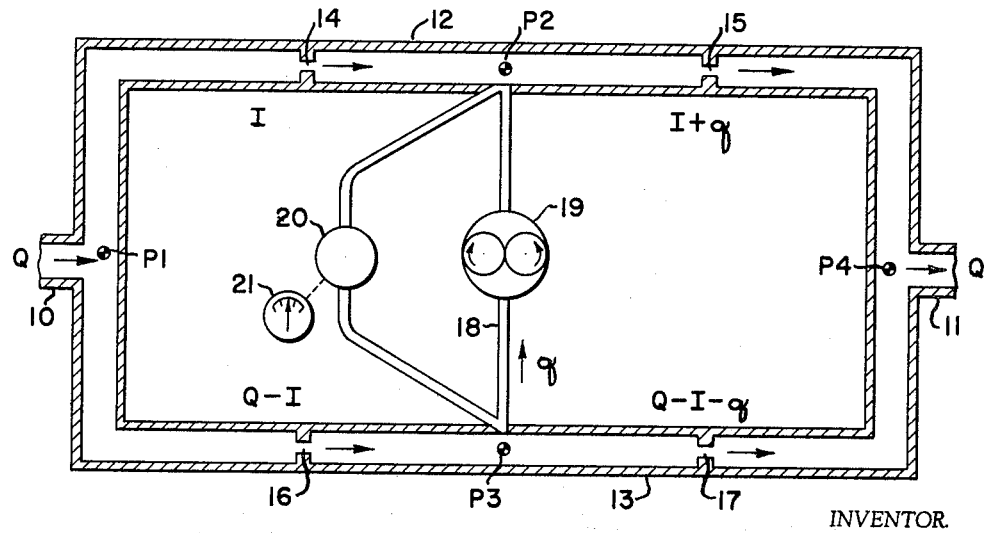

A fuller understanding of the invention may be had by reference to the following description and claims taken in conjunction with the accompanying drawings in which:

FIG. 1 is a schematic drawing of a flowmeter utilizing four flow restrictors, a constant volume recirculating pump and a differential pressure indicator or transducer, said flowmeter being particularly useful for measuring flows in which the volume recirculated by the recirculating pump exceeds the flow to be measured; and FIG. 2 is a schematic drawing of another embodiment of a flowmeter utilizing four flow restrictors, a constant volume recirculating pump and a differential pressure indicator or transducer, said embodiment being particularly useful in measuring flows wherein the constant volume recirculated by the recirculating pump is less than the volume of flow being measured.

Referring now to FIG. 1, 10 is an inlet conduit whose volumetric flow Q is to be measured by the flowmeter of this invention. Outlet conduit 11 has a volumetric flow identical to that in the conduit 10. Branch conduits 12 and 13 connect inlet conduit 10 with said outlet conduit 11. Branch conduit 12 contains two orifices 14 and 15 which will be designated as the first and second orifices throughout this specification, and branch conduit 13 contains two orifices 16 and 17 which will be designated as the third and fourth orifices throughout this specification. A recirculation conduit 18, containing a constant volume recirculating pump 19, connects branch conduit 12 at a point intermediate orifices 14 and 15 with branch conduit 13 at a point intermediate orifices 16 and 17. Pump 19 recirculates liquid at a constant volumetric flow rate $q$ which is greater than flow Q in conduit 10. In the embodiment shown in FIG. 1, a differential pressure measuring device or transducer 20 having gauge 21 measures the differential pressure between the junction of inlet conduit 10 with branch conduits 12 and 13 and the junction of outlet conduit 11 with branch conduits 12 and 13. For convenience these points will be designated 1 and 4 respectively. Points 2 and 3 respectively will designate the junctions between recirculation conduit 18 and branch conduits 12 and 13 respectively. In the embodiment shown in FIG. 1, the first and second orifices 14 and 15 respectively have the same flow characteristics. The third and fourth orifices 16 and 17 also have their own identical flow characteristics which are not the same as the flow characteristics as orifices 14 and 15.

The embodiment shown in FIG. 2 is the same as the embodiment shown in FIG. 1, except that the differential pressure measurement is between points 2 and 3, i.e., the junction of recirculation conduit 18 with branch conduits 12 and 13 respectively. This embodiment is intended for use where the constant volume $q$ recirculated in pump 19 is less than the volume of flow Q in conduit 10 which is to be measured. In this embodiment the first and third orifices 14 and 16, respectively, have the same or matched flow characteristics and the second and fourth orifices 15 and 17, respectively, have the same flow characteristics which are different from the flow characteristics of orifices 14 and 16.

It will be observed that in both embodiments of this invention, the pressure differential is measured between a point on the upstream side of the recirculating pump 19 and a point on the downstream side of pump 19.

While orifices represent a preferred type of flow restrictor and have been illustrated as a specific embodiment herein, other forms of flow restrictors can be used. In accordance with well-known practices, the cross-sectional areas of the conduits are large resulting in relatively low liquid velocities such that mixing losses and pressure inconsistencies between orifices or flow restrictors 14 and 16 and between 16 and 17 are not significant.

Referring to FIGURE 1, if we designate the flow through orifice 14 as I, the flows through the other orifices will be $q-I$, $Q+I$, and $q-I-Q$, as shown.

We can express the flow versus pressure drop relationship for an orifice as follows:

(1) $$Q = CA\sqrt{\frac{2}{\rho}(\Delta P)}$$

$Q$ = volumetric flow rate where:

$C$ = flow restrictor coefficient
$A$ = flow area of restrictor
$P$ = differential pressure $$\rho = \text{density} = \frac{\text{specific weight of fluid}}{\text{gravity constant}}$$

If the orifices 14 and 15 are the same, and orifices 16 and 17 are the same, but different from orifices 14 and 15, then the flow versus pressure drop relationships for each of the four orifices in FIGURE 1 can be expressed as follows:

(2) $$I = C_1 A_1 \sqrt{\frac{2}{\rho}(P_2 - P_1)}$$

(3) $$q - I = C_1 A_1 \sqrt{\frac{2}{\rho}(P_2 - P_4)}$$

(4) $$Q + I = C_2 A_2 \sqrt{\frac{2}{\rho}(P_1 - P_3)}$$

(5) $$q - I - Q = C_2 A_2 \sqrt{\frac{2}{\rho}(P_4 - P_3)}$$

By squaring Equations 2, 3, 4 and 5 above, we obtain the following:

(6) $$I^2 = (C_1 A_1)^2 \frac{2}{\rho}(P_2 - P_1)$$

(7) $$q^2 - 2qI + I^2 = (C_1 A_1)^2 \frac{2}{\rho}(P_2 - P_4)$$

(8) $$Q^2 = 2QI + I^2 = (C_2 A_2)^2 \frac{2}{\rho}(P_1 - P_3)$$

(9) 
$$q^2 + Q^2 + I^2 - 2qQ - 2qI + 2QI = (C_2 A_2)^2 \frac{2}{\rho}(P_4 - P_3)$$

By subtracting (6) from (7) and (9) from (8), we obtain the following:

(10) $$q^2 - 2qI = (C_1 A_1)^2 \frac{2}{\rho}(P_1 - P_4)$$

(11) $$-q^2 + 2qI + 2qQ = (C_2 A_2)^2 \frac{2}{\rho}(P_1 - P_4)$$

By combining Equations 10 and 11 and simplifying, we obtain the following:

(12) $$\frac{q - 2I}{(C_1 A_1)^2} = \frac{-q + 2I + 2Q}{(C_2 A_2)^2}$$

If we let $$(C_1 A_1)^2 = x$$

and $$(C_2 A_2)^2 = y$$

and then solve Equation 12 for I, we obtain the following:

(13) $$I = \frac{q(x+y) - 2Qx}{2(x+y)} = \frac{q}{2} - \frac{Qx}{(x+y)}$$

The flow through the other three orifices can then be expressed as follows:

(14) $$q - I = \frac{q(x+y) + 2Qx}{2(x+y)} = \frac{q}{2} + \frac{Qx}{(x+y)}$$

(15) $$Q + I = \frac{q(x+y) + 2Qy}{2(x+y)} = \frac{q}{2} + \frac{Qy}{(x+y)}$$

(16) $$q - I - Q = \frac{q(x+y) - 2Qy}{2(x+y)} = \frac{q}{2} - \frac{Qy}{(x+y)}$$

The pressure drop between points 1 and 4 in FIGURE 1 is sensed on differential pressure sensor 20. Using Equation 10, we can express this differential pressure as follows:

(17) $$P_1 - P_4 = \frac{(q^2 - 2qI)\rho}{2(C_1 A_1)^2}$$

By substituting for I from Equation 13 in Equation 17 and noting that $(C_1 A_1)^2 = x$, we obtain the following:

(18) $$P_1 - P_4 = \frac{q}{(x+y)}(\rho Q)$$

Since $q$, a quantity representing the sum of $x$ and $y$ are constants, and since $\rho Q$ is equal to the mass flow rate, we can then express Equation 18 as follows:

(19) $$P_1 - P_4 = KM$$

where $$K = \frac{q}{(x+y)}$$

$M = \rho Q =$ mass flow rate

Equation 19 above shows that, for the arrangement in FIGURE 1, where the recirculating flow $q$ is greater than the measured flow Q, the differential pressure $P_1 - P_4$ is directly proportional to the mass flow rate passing through conduits 10 and 11.

Referring now to FIGURE 2, by a derivation similar to the one used for FIGURE 1, it can be shown that where the recirculating flow $q$ is smaller than the measured flow Q, the differential pressure $P_2 - P_3$ can be expressed as follows:

(20) $$P_2 - P_3 = \frac{q}{(x+y)}(\rho Q) = KM$$

This indicates that the differential pressure $P_2 - P_3$ is directly proportional to the mass flow rate passing through conduits 10 and 11.

Although we have described our invention with a certain degree of particularity, it is understood that the present disclosure has been made only by way of example and that numerous changes in the details of construction and the combination and arrangements of parts may be resorted to without departing from the spirit and scope of the invention as hereinafter claimed.

We claim:

1. A mass flowmeter adapted to measure the mass flow rate of an effectively incompressible fluid passing therethrough comprising inlet and outlet conduits having a flow which is to be measured, first and second branch conduits connecting said inlet and outlet conduits, first and second flow restrictors in said first branch conduit, third and fourth flow restrictors in said second branch conduit, a constant volumetric pump pumping a given constant volumetric flow rate independently of changes in density of said fluid connecting said first and second branch conduits at points between the flow restrictors therein, said flow restrictors consisting of two matched pairs in which both flow restrictors in a pair have the same flow characteristics and the flow restrictors in one pair have different flow characteristics from the flow restrictors in the other pair, and means for measuring the differential pressure across the two of said flow restrictors where the differential pressure varies linearly with the mass flow rate of fluid passing through said flowmeter.

2. A mass flowmeter adapted to measure the mass flow rate of a liquid passing therethrough comprising inlet and outlet conduits having a flow which is to be measured, first and second branch conduits connecting said inlet and outlet conduits, first and second flow restrictors in said first branch conduit, third and fourth flow restrictors in said second branch conduit, means for pumping liquid at a constant volumetric flow rate greater than the flow rate in said inlet and outlet conduits, said pumping means connecting said branch conduits at points between the flow restrictors therein, said first and second restrictors having the same flow characteristics, said third and fourth flow restrictors having the same flow characteristics, the flow characteristics of said third and fourth flow restrictors being different from the flow characteristics of said first and second flow restrictors, and means for measuring the differential pressure between said inlet conduit and said outlet conduit.

3. A mass flowmeter adapted to measure the mass flow rate of a liquid passing therethrough comprising inlet and outlet conduits having a flow rate which is to be measured, first and second branch conduits connecting said inlet and outlet conduits, first and second flow restrictors in said first branch conduit, third and fourth flow restrictors in said second branch conduit, means for pumping liquid at a constant volumetric rate which is less than the flow rate in said inlet and outlet conduits between a point in said first branch conduit intermediate said first and second flow restrictors and a point in said second branch conduit intermediate said third and fourth flow restrictors, said first and third flow restrictors having the same flow characteristics, said second and fourth flow restrictors having the same flow characteristics, the flow characteristics of said second and fourth flow restrictors being different from the flow characteristics of said first and third flow restrictors, and means for measuring the differential pressure between a point in said first conduit intermediate said first and second flow restrictors and a point in said second conduit intermediate said third and fourth flow restrictors where the differential pressure varies linearly with changes in the mass flow rate of liquid flowing through the flowmeter.

4. A mass flowmeter adapted to measure the mass flow rate of an effectively incompressible fluid flowing therethrough independently of changes in the density of such fluid comprising, first means for dividing the fluid flowing therethrough into separated, flowing, first and second parts, second means for re-combining the fluid flowing in said first and second parts into a common flowing part, said first part comprising a first and second flow restrictor in spaced apart relationship, said second part comprising a third and fourth flow restrictor in spaced apart relationship, one pair of said flow restrictors having the same flow characteristics, a second pair of different flow restrictors having the same flow characteristics, the flow characteristics of one pair of flow restrictors being different from the flow characteristics of said second pair of flow restrictors, the flow restrictor coefficients of said one pair changing in one direction with a given change of viscosity of fluid while the flow restrictor coefficients of said second pair changing in the opposite direction with said given change of viscosity, means operating independently of changes in density of fluid flowing through said first and second parts for pumping fluid at a constant volumetric flow rate from said first part at a location intermediate said first and second flow restrictors into said second part at a location intermediate said third and fourth flow restrictors, means for providing a linear indication of changes in said mass flow rate of fluid which indication does not vary with changes in density of said fluid comprising means for measuring the differential pressure across two of said flow restrictors where the differential pressure varies linearly with the mass flow rate of fluid flowing through the flowmeter.

5. A mass flowmeter adapted to measure the mass flow rate of an effectively incompressible fluid flowing therethrough between its input and output end independently of changes in the density of said fluid comprising, separate first and second branch conduits connected between said input and output ends for providing a path of flow for said fluid from said input to said output end, first and second flow restrictors disposed in said first conduit along the path of flow therethrough, third and fourth flow restrictors disposed in said second conduit along the path of flow therethrough, said first and second flow restrictors consisting of one matched pair and said second and third flow restrictors consisting of a second matched pair, the flow restrictors in each pair have the same flow characteristics and the flow restrictors in said one pair have a flow restrictor coefficient which changes in one direction with a given change in viscosity of fluid while the flow coefficient of said second pair of flow restrictors changes in the opposite direction, means for pumping fluid at a constant volumetric flow rate which is greater than the flow rate of said fluid flowing through said flowmeter from said first conduit at a location intermediate said first and second flow restrictors into said second conduit at a location intermediate said third and fourth flow restrictors, and means responsive to the differential pressure between said input and output ends for producing a signal proportional to the product of the density, volumetric flow rate of the fluid passing through said flowmeter and said pumped constant volumetric flow rate.

6. In combination a source of liquid utilization means for utilizing liquid from said source, means for transferring liquid from said source to said utilization means, said transferring means having an input end connected to said source and an output end connected to said utilization means, said transferring means comprising separate first and second branch conduits connected between said input and output ends for providing a path of flow for said liquid from said input to said output ends, first and second flow restrictors disposed in said first conduit along the path of flow therethrough, third and fourth flow restrictors disposed in said second conduit along the path of flow therethrough, said first and third flow restrictors having the same flow characteristics, said second and fourth flow restrictors having the same flow characteristics, the flow characteristics of said second and fourth flow restrictors being different from the flow characteristics of said first and third flow restrictors, means operating independently of changes in density of liquid flowing through said transferring means for pumping liquid at a constant volumetric flow rate from said conduit at a location intermediate said first and second flow restrictors into said second conduit at a location intermediate said third and fourth flow restrictors, and means for measuring the mass flow rate of liquid flowing through said transferring means which is independent of changes in the density of liquid flowing therethrough comprising means for producing a signal which varies linearly with the product of the liquid being transferred, the volumetric flow rate of liquid being transferred and said pumped constant volumetric flow rate.

References Cited by the Examiner
UNITED STATES PATENTS

| | | | |
|---|---|---|---|
| 2,728,219 | 12/1955 | Martin | 73—30 |
| 2,838,927 | 6/1958 | Gray | 73—30 |

RICHARD C. QUEISSER, *Primary Examiner.*

DAVID SCHONBERG, *Examiner.*

E. GILHOOLY, *Assistant Examiner.*